United States Patent
Barone et al.

(10) Patent No.: US 9,537,902 B2
(45) Date of Patent: Jan. 3, 2017

(54) ENABLING DEVICES WITHOUT NATIVE BROADCAST CAPABILITY TO ACCESS AND/OR RECEIVE BROADCAST DATA IN AN EFFICIENT MANNER

(71) Applicant: QUALCOMM Incorporated, San Diego, CA (US)

(72) Inventors: Joseph P. Barone, San Diego, CA (US); Nermeen A. Bassiouny, San Diego, CA (US); Nagaraju Naik, San Diego, CA (US); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 14/046,367

(22) Filed: Oct. 4, 2013

(65) Prior Publication Data
US 2014/0229529 A1    Aug. 14, 2014

Related U.S. Application Data

(60) Provisional application No. 61/764,072, filed on Feb. 13, 2013.

(51) Int. Cl.
*H04L 29/06* (2006.01)

(52) U.S. Cl.
CPC ......... *H04L 65/103* (2013.01); *H04L 65/4076* (2013.01)

(58) Field of Classification Search
CPC ..... H04L 65/60; H04L 65/103; H04L 65/4076
See application file for complete search history.

(56) References Cited

U.S. PATENT DOCUMENTS

| | | | |
|---|---|---|---|
| 7,181,455 B2 * | 2/2007 | Wookey | H04L 29/06 |
| 8,027,353 B2 | 9/2011 | Damola et al. | |
| 2002/0178236 A1 * | 11/2002 | Patel | H04B 7/18586 709/218 |
| 2009/0017796 A1 * | 1/2009 | Foti | H04L 29/12584 455/414.1 |
| 2010/0306538 A1 | 12/2010 | Thomas et al. | |
| 2011/0173249 A1 | 7/2011 | Lee et al. | |

(Continued)

*Primary Examiner* — Tonia L Dollinger
*Assistant Examiner* — Dixon Dabipi
(74) *Attorney, Agent, or Firm* — The Marbury Law Group, PLLC

(57) ABSTRACT

Methods, devices and systems for delivering broadcast data to client devices that do not support receiving broadcast transmissions. In an embodiment, a gateway device may be configured to receive a manifest file and related data segments via a first type of network protocol, such as LTE broadcasts. The manifest file may include data defining network addresses for one or more network resources, and may be modified to include a network address of a proxy server for the network resources. The proxy server may be configured to accept requests for data segments from client devices conforming to a second type of network protocol different from the first protocol, such as unicast. In an embodiment, the gateway device may transmit broadcast data for storage in a cache or alternatively a separate storage location accessible to the proxy server. The proxy server may be included in the gateway device or client devices.

19 Claims, 13 Drawing Sheets

(56) References Cited

U.S. PATENT DOCUMENTS

| | | | |
|---|---|---|---|
| 2011/0202965 A1* | 8/2011 | Henry | H04N 7/17318 725/110 |
| 2011/0246567 A1 | 10/2011 | Cedervall et al. | |
| 2011/0274109 A1* | 11/2011 | Stevens | H04L 12/185 370/390 |
| 2012/0023533 A1* | 1/2012 | Wang | H04N 21/4622 725/109 |
| 2012/0259994 A1* | 10/2012 | Gillies | H04L 12/1881 709/231 |
| 2012/0327780 A1* | 12/2012 | Moreman | H04L 45/16 370/241 |

* cited by examiner

ENABLING DEVICES WITHOUT NATIVE BROADCAST CAPABILITY TO ACCESS AND/OR RECEIVE BROADCAST DATA IN AN EFFICIENT MANNER

RELATED APPLICATIONS

The present application claims the benefit of priority to U.S. Provisional Application No. 61/764,072, entitled "Broadcast Data Redistribution System" filed Feb. 13, 2013, the entire contents of which are hereby incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, and video teleconferencing devices. Digital video devices may implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques may perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames. After video data has been encoded, the video data may be packetized for transmission or storage. The video data may be assembled into a video file conforming to any of a variety of standards, such as the International Organization for Standardization (ISO) base media file format and extensions thereof, such as AVC.

Some devices may be configured to utilize Dynamic Adaptive Streaming over HTTP (or DASH) technology that segments media files, such as digital movies. Such devices may receive DASH segments from typical HTTP servers over the Internet, enabling the devices to access streaming media content in various bitrates, qualities, and network conditions. However, such devices may be limited in their ability to retrieve streaming media due to their native networking configurations. In particular, many devices used for consuming media, such as home set-top boxes, laptops, and other computing devices, may not include transceivers, radios, or other technologies capable of receiving broadcast content. For example, a family laptop may utilize a non-broadcast communication link (e.g., a unicast connection via WiFi/local area network) to a wireless router to receive media content from various data sources over the Internet. Thus, such media consuming devices may not be capable of retrieving files delivered over broadcast/multi-cast networks, limiting the possible access points and content that may be enjoyed by their users.

SUMMARY

The various embodiments include devices, methods, and systems for delivering broadcast data to client devices that are not compatible or otherwise do not support receiving broadcast transmissions (e.g., non-LTE devices). In general, a device may be configured to receive data, such as streaming data segments configured for use with Dynamic Adaptive Streaming over HTTP (DASH) technology, via broadcast protocols and provide that data to a proxy server front-end for distribution to client devices via non-broadcast protocol communications. In an embodiment, a gateway device (such as a broadcast Dynamic Adaptive Streaming over HTTP (DASH) gateway device) may be configured to receive a manifest file via a first type of network protocol, wherein the manifest file includes data defining network addresses for one or more network resources, such as data segments of a media file. The first type of network protocol may be a broadcast protocol, such as File Delivery over Unidirectional Transport (FLUTE), FLUTE Asynchronous Layered Coding (FLUTE ALC), layered coding transport (LCT), user datagram protocol (UDP), broadcast reception of real-time protocol (RTP) content, or multicast Internet protocol (IP). The gateway device may determine a network address of a proxy server for the network resources, wherein the proxy server is configured to accept requests conforming to a second type of network protocol. The second type of network protocol may be a non-broadcast protocol (e.g., a unicast protocol) that is different from the first type.

The gateway device may also modify the data of the manifest file defining the network addresses for the network resources to include at least a portion defining the network address of the proxy server, and may send the modified manifest file to the proxy server. In another embodiment, a method includes receiving a manifest file via a first type of network protocol, wherein the manifest file includes data defining network addresses for one or more network resources, determining a network address of a proxy server for the network resources, wherein the proxy server is configured to accept requests conforming to a second type of network protocol, wherein the second type is different than the first type, modifying the data of the manifest file defining the network addresses for the network resources to include at least a portion defining the network address of the proxy server, and sending the modified manifest file to the proxy server.

In various embodiments, client devices may be configured to consume (e.g., render) streaming data segments and may be separate devices from gateway devices. The proxy server may be included in the gateway device or client devices. In an embodiment, gateway devices may transmit broadcast data for storage in a cache or alternatively a separate storage location or storage device available to or accessible by the proxy server unit. In another embodiment, a gateway device may transmit streaming data segments to a storage device available to a proxy server unit without receiving requests from a proxy server. In an embodiment, the gateway device may transmit data to a storage device or location accessible to the proxy server as soon as the data has been received, such as via a wide area network.

The details of one or more examples are set forth in the accompanying drawings and the description below. Other features, objects, and advantages will be apparent from the description and drawings, and from the claims.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
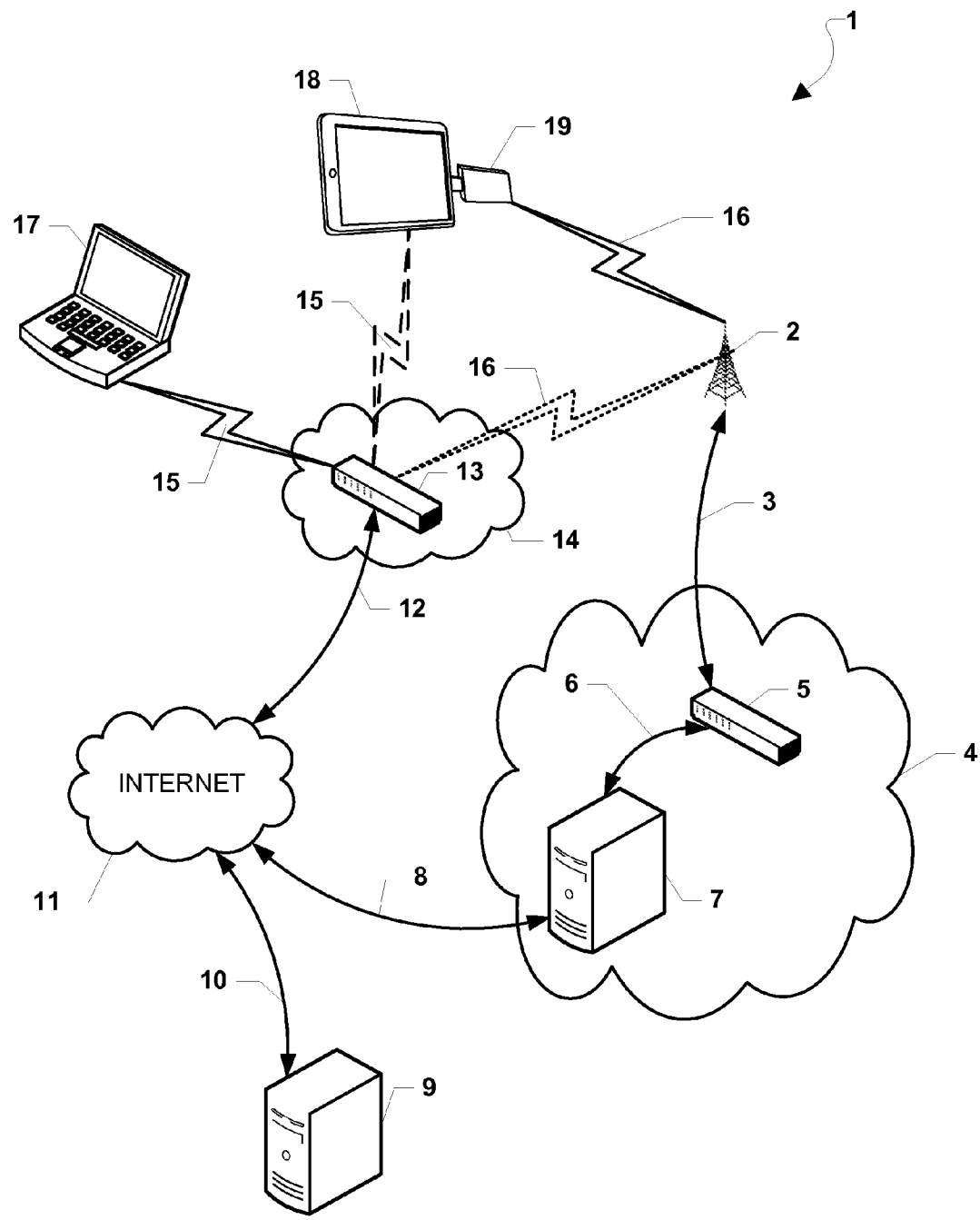
FIG. 1A is a communication system block diagram of a communication network suitable for use with an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations. The terms "mobile device" and "mobile computing device" are used herein to refer to any one or all of cellular telephones, smart-phones (e.g., iPhone®), webpads, tablet computers, WiFi enabled electronic devices, personal data assistants (PDA's), laptop computers, personal computers, and similar electronic devices.

This disclosure describes techniques for enabling broadcast access to network data for devices that are not configured to utilize broadcast (or multicast) protocols. The various embodiment techniques may include providing a broadcast (or multicast) enabled device (e.g., a gateway device) and a proxy server for a client device that is not broadcast/multicast enabled. The proxy server (or proxy server device) may receive media data from the gateway device that utilizes broadcast (or multicast) protocols to receive the media data from remote sources (e.g., web servers, etc.). The client device may be configured to utilize a unicast protocol to retrieve data (e.g., the media data) from the proxy server, such as in accordance with Dynamic Adaptive Streaming over HTTP (DASH). For example, in response to the gateway device receiving DASH data segments from a remote source via a broadcast protocol, the proxy server device may transmit the DASH streaming data segments to the client device using unicast transmissions over a local area network (LAN).

In various embodiments, client devices (also referred to as "user equipment") may be configured to consume (e.g., request and download) streaming data, such as DASH data segments (or DASH streaming data segments). For example, a client device may be a laptop device in a home that is executing an application for rendering streaming video. Client devices may request and download media data from the proxy server as a streaming service that may include multiple representations for video and/or audio data of multimedia content. In various embodiments, client devices may be separate devices from the gateway device.

In an embodiment, the gateway device may include a gateway module and a proxy server unit that are coupled together or otherwise in communication with each other within the same device. For example, the gateway device may include the proxy server unit in a first device that transmits DASH segments to a separate, second device (i.e., a client device) for use/rendering. In an embodiment, the gateway device and the proxy server (or proxy server unit) may exchange data via inter-process communications (IPC).

In various embodiments, the proxy server may be logic, devices, units, components, software, applications, or other routines configured to receive data from the gateway device. The proxy server may be configured to cache data from the gateway device, such as broadcast streaming data segments. The proxy server may be configured to request the retrieval of particular data segments from the gateway device in response to associated requests from client devices. In an embodiment, the proxy server may be included within the gateway device, the client device, or within a combination of devices/instantiations (e.g., a set of proxy servers each supporting a single broadcast DASH service). Accordingly, non-broadcast protocol communications between the proxy server and a client device may include both wireless signals, wired signals, and inter-device signals (e.g., messaging via circuitry within the client device).

In various embodiments, the proxy server may act as a front-end request handler for a gateway device. The proxy server may accept DASH requests (e.g., requests for a media presentation description (MPD), initialization segments, and media segments) from an arbitrary number of remote DASH client devices for a broadcast service. A limit on the number of client devices may be determined by the specific platform. The proxy server may serve up the DASH responses to the client device on behalf of the gateway device. The proxy server may be responsible for scalability. Examples of the techniques are described in greater detail below. In various embodiments, the proxy server (or proxy server device) may be referred to as a DASH Proxy Server (or "DPS").

In various embodiments, the gateway device may be configured to receive broadcast data, such as a long-term evolution (LTE) broadcast backhaul, in accordance with various broadcast or multicast protocols. For example, the gateway device may be configured to receive multimedia broadcast multicast services (MBMS) via LTE broadcast streams or other broadcast protocols such as File Delivery over Unidirectional Transport (FLUTE), FLUTE Asynchronous Layered Coding (FLUTE ALC), layered coding transport (LCT), user datagram protocol (UDP), broadcast reception of real-time protocol (RTP) content, and multicast Internet protocol (IP). The broadcast DASH gateway may be configured to modify a manifest (such as a media presentation description) such that references to addresses for network resources (such as DASH segments) refer to the proxy server. In various embodiments, the gateway device may include various modules, units, and/or components, such as a broadcast DASH gateway (e.g., an LTE broadcast DASH gateway), which may be referred to as "BDGW."

The gateway device (e.g., via a broadcast DASH gateway module) may also be configured either to deliver media data to the proxy server in response to explicit requests from the proxy server, or to a location available to the proxy server (e.g., a file directory). For example, the broadcast DASH gateway may provide DASH data segments to a storage location (e.g., external hard drive, server computer, database, etc.) associated with the proxy server. Thus, a location available to the proxy server may comprise the proxy server itself, or a separate network location that is available to the proxy server.

DASH is specified in ISO/IEC 23009-1:2012, "Information technology—Dynamic adaptive streaming over HTTP (DASH)—Part 1: Media presentation description and segment formats," Apr. 1, 2012, available at http://standards.iso.org/ittf/PubliclyAvailableStandards/c057623_ISO_IEC_23009-1_2012.zip.

Although the techniques of this disclosure are primarily described with respect to DASH, it should be understood that other network retrieval techniques and methodologies may be used instead of DASH. For example, the techniques of this disclosure may be applied to enabling devices without native broadcast capability to retrieve files delivered over broadcast, as well as receive general data-cast objects sent over a broadcast/multicast network.

One example use case for the techniques of this disclosure may be a Network Access Point, to which data may be broadcast (e.g., via an LTE Broadcast backhaul) and from which a set of client devices or user equipment ("UEs"), such as mobile devices, set-top boxes, etc., may receive the data via a unicast connection (e.g., WiFi). The Network Access Point could be a local home router, a public kiosk, a commercial hot spot, etc.

Another example use case may be an enhanced Multimedia Broadcast Multicast Service (eMBMS)-enabled USB (universal serial bus) dongle configured to provide broadcast data to and through (e.g., the device hosting the USB dongle acting as a network router) a device without native broadcast capability.

Certain examples of the techniques of this disclosure are described below. In various embodiments, there may be one proxy server device instantiated for all broadcast DASH services. In other embodiments, however, the techniques of this disclosure may be implemented with a set of proxy servers each supporting a single broadcast DASH service.

In general, in HTTP streaming, frequently used operations may include HEAD, GET and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there may be several track fragments of different tracks. In HTTP streaming, a media presentation may be a structured collection of data that is accessible to the client. The client device may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, video or timed text (e.g., for closed captioning). Media components may be time-continuous across boundaries of consecutive media segments within one representation.

FIG. 1A illustrates a communication network 1 suitable for use with the various embodiments. The communication network 1 may include various computing devices, such as a laptop mobile computing device 17 and a tablet mobile computing device 18. The computing devices 17, 18 may be configured to transmit wireless signals to a wireless router 13 via a wireless data links 15. For example, the computing devices 17, 18 may be connected to the wireless router 13 within a family home. The computing devices 17, 18 may transmit the wireless signals via the wireless data link 15 by utilizing WiFi transceivers/radios. The wireless router 13 may be associated with a local area network 14 and may provide a connection or data link 12 to the Internet 11, thus enabling the computing devices 17, 18 to receive data from other devices over the Internet 11. In various embodiments, the wireless router 13 may be configured to include a proxy server and/or a broadcast gateway (e.g., Broadcast DASH Gateway) as described below. For example, the wireless router 13 may act as a gateway device that includes a gateway module and a proxy server module.

In an embodiment, a USB device 19 (or USB dongle) may be connected to and in signal communication with the tablet mobile computing device 18, such as by interfacing via a USB port included within the tablet mobile computing device 18. In other embodiments, the USB device 19 may be inserted into, interface with, or otherwise connect with other devices, such as the wireless router 13 and/or the laptop mobile computing device 17. The USB device 19 may be configured to utilize a long-range radio or wireless transceiver to exchange data with a cellular tower 2 via a long-range data link 16. For example, the USB device 19 may be equipped with a cellular network modem and an antenna capable of transmitting data transmissions to a 3G, 4G or LTE cellular network. Various data may be received via the data link 16 from the cellular tower 2, such as cell site identification information, general location information, and other data relevant to the cellular network associated with the cellular tower 2. In an embodiment, the wireless router 13 may also be configured to communicate via a wireless data link 16 with a cellular network. In various embodiments, the USB device 19 may be configured to include a proxy server and/or a broadcast gateway (e.g., Broadcast DASH Gateway) as described below. For example, the USB device 19 may be a gateway device that includes a gateway module and a proxy server module.

In an embodiment, the USB device 19 may establish communications with a data network 4 via a data link 3 from the cellular tower 2. For example, the USB device 19 may transmit data through the cellular tower 2 to a cellular telephone system. The data network 4 may include switching centers 5 that are coupled in network connections 6 to Internet gateway servers 7 to enable data connections 8 to the Internet 11. The data network 4 may also enable telephone calls to be made to mobile computing devices, such as smartphones, tablet devices, and feature phones. In an embodiment, the data network 4 may also communicate data, telephone calls, and other information to landline telephones (not shown).

In various embodiments, the wireless router 13 and/or the USB device 19 may utilize the data links 12, 16 to download or otherwise receive data from data sources, such as a web server, a hosting server, or a cloud storage server. For example, an application (or app), routine, or other operations executing on the wireless router 13 or the USB device 19 (or the computing devices 17, 18 connected to the router 13 or the USB device 19) may initiate a download of data from the applications server 9 connected to the Internet 11 via a data link 10. Data sources, such as the applications server 9, may be third-party devices associated with services that provide useful data, such as streaming media (e.g., videos, music, podcasts, etc. streamed using DASH technology).

Figure 1B:
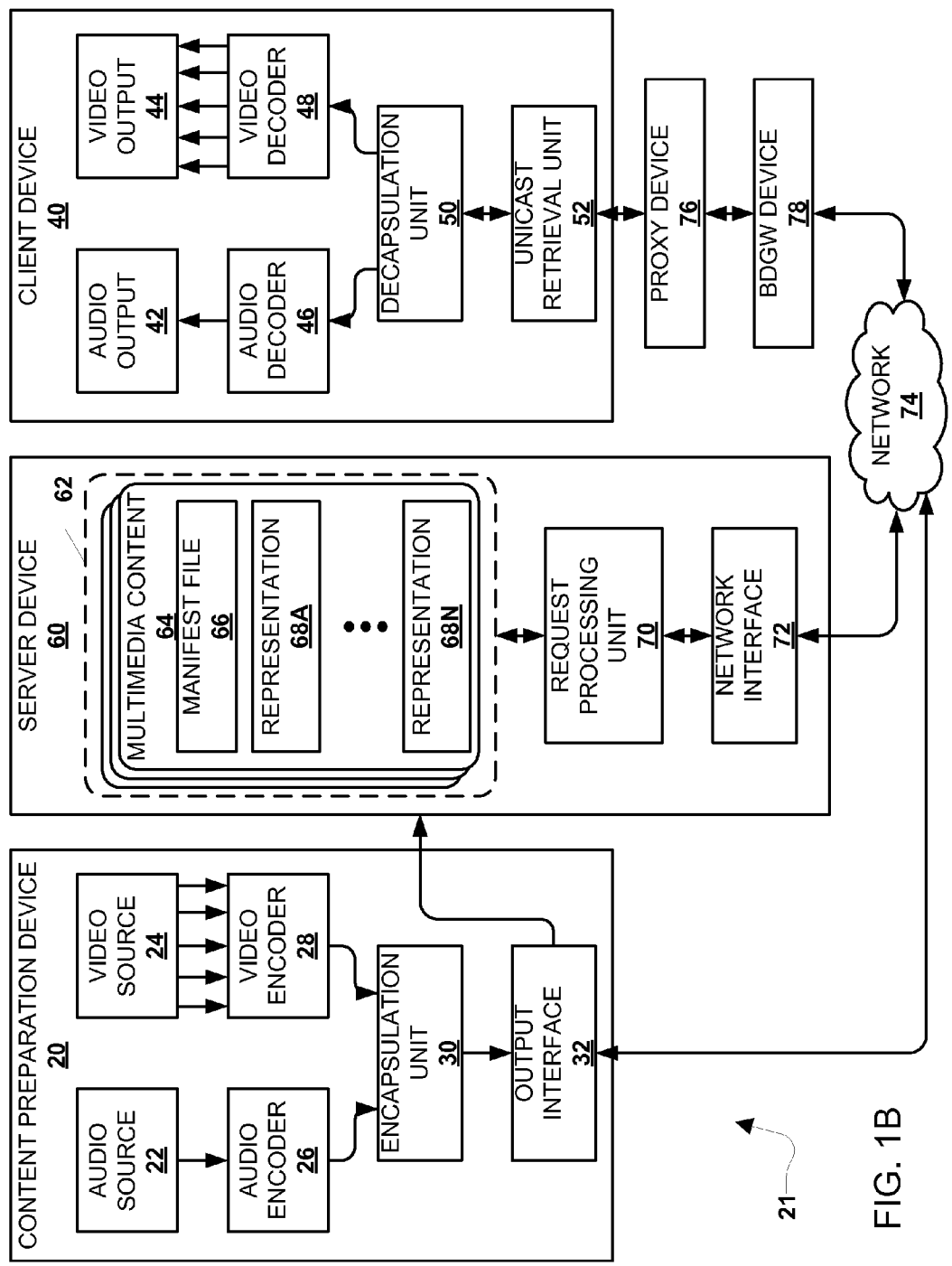
FIG. 1B is a block diagram illustrating an example system that implements techniques for streaming media data over a network.

FIG. 1B is a block diagram illustrating an example system 21 that implements techniques for streaming media data over a network. In this example, system 21 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1B, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1B, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1B, server device 60 includes storage medium 62 that stores various multimedia contents 64, each including a respective manifest file 66 and one or more representations 68A–68N (representations 68). In some examples, output interface 32 may also send data directly to network 74.

In some examples, representations 68 may be separated into adaptation sets. As noted above, in some instances, an adaptation set may also be referred to as a "representation group." That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1B, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, unicast retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Unicast retrieval unit 52 may comprise, for example, a web browser or a media client configured to submit HTTP GET and partial GET requests. Unicast retrieval unit 52 may correspond to software instructions executed by one or more processors or processing units (not shown) of client device 40. In some examples, all or portions of the functionality described with respect to unicast retrieval unit 52 may be implemented in hardware, or a combination of hardware, software, and/or firmware, where requisite hardware may be provided to execute instructions for software or firmware.

Unicast retrieval unit 52 may compare the decoding and rendering capabilities of client device 40 to characteristics of representations 68 indicated by information of manifest file 66. Unicast retrieval unit 52 may initially retrieve at least a portion of manifest file 66 to determine characteristics of representations 68. For example, unicast retrieval unit 52 may request a portion of manifest file 66 that describes characteristics of one or more adaptation sets, in accordance with the techniques of this disclosure. Unicast retrieval unit 52 may select a subset of representations 68 (e.g., an adaptation set) having characteristics that can be satisfied by the coding and rendering capabilities of client device 40. Unicast retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, unicast retrieval unit 52 may retrieve data from relatively high bitrate representations, whereas when available network bandwidth is low, unicast retrieval unit 52 may retrieve data from relatively low bitrate representations. In this manner, client device 40 may stream multimedia data over network 74 while also adapting to changing network bandwidth availability of network 74.

Proxy device 76 may be configured to receive data in accordance with a broadcast or multicast network protocol, such as eMBMS or IP multicast. In such examples, proxy device 76 may submit a request to join a multicast network group associated with particular media content. In accordance with the techniques of this disclosure, proxy device 76 may act as a proxy server for server device 60 and/or as a proxy client for client device 40. After joining the multicast group, proxy device 76 may receive data of the multicast group without further requests issued to server device 60 or content preparation device 20. Proxy device 76 may submit a request to leave the multicast group when data of the multicast group is no longer needed, e.g., to stop playback or to change channels to a different multicast group.

Unicast retrieval unit 52 may retrieve data from proxy device 76. In particular, it is assumed in the example of FIG. 1B that client device 40 is capable of retrieving streaming media data in accordance with a unicast protocol, but not in accordance with a broadcast or multicast protocol. Therefore, proxy device 76 may retrieve media data in accordance with a broadcast or multicast protocol, and then act as a unicast proxy server to client device 40. In this manner, client device 40 may submit unicast HTTP requests to proxy device 76. After retrieving media data from proxy device 76, unicast retrieval unit 52 may provide the media data to decapsulation unit 50.

Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, unicast retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, unicast retrieval unit 52, and/or decapsulation unit 50 may comprise an integrated circuit, a microprocessor, and/or a wireless communication device, such as a cellular telephone.

Client device 40, server device 60, proxy device 76, and/or content preparation device 20 may be configured to operate in accordance with the techniques of this disclosure. For purposes of example, this disclosure describes these techniques with respect to client device 40, proxy device 76, and server device 60. However, it should be understood that content preparation device 20 may be configured to perform certain aspects of these techniques, instead of server device 60. That is, content preparation device 20 and server device 60 may be functionally integrated.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Video encoder 28, video decoder 48, audio encoder 26, audio decoder 46, encapsulation unit 30, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, and/or encapsulation unit 30, and/or decapsulation unit 50 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

In an embodiment, a broadcast DASH gateway device 78 (referred to as a "BDGW device" in FIG. 1B) may be coupled to or otherwise in communication with the proxy device 76. The broadcast DASH gateway device 78 may be connected to the network 74 and configured to receive and/or retrieve broadcast data, such as from the server device 60.

Figure 1C:
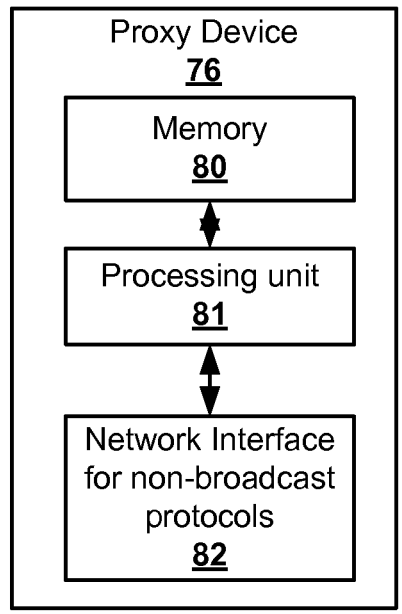
FIG. 1C is a component block diagram illustrating example components of a proxy device suitable for use with various embodiments.

FIG. 1C illustrates embodiment components of a proxy device 76 as described above. In particular, the proxy device 76 may include a memory unit 80, a processing unit 81, and at least a network interface 82 configured for non-broadcast protocols. For example, the proxy device 76 may utilize a local area network interface 82 component (e.g., a LAN interface) for communicating via unicast protocols with the client device 40.

Figure 1D:
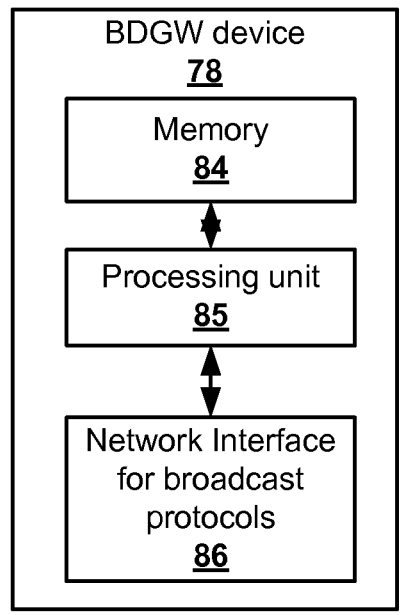
FIG. 1D is a component block diagram illustrating example components of a broadcast DASH gateway device suitable for use with various embodiments.

FIG. 1D illustrates embodiment components of the broadcast DASH gateway device 78 (or "BDGW device") as described above. In particular, the broadcast DASH gateway device 78 may include a memory unit 84, a processing unit 85, and at least a network interface 86 configured for broadcast protocols. For example, the broadcast DASH gateway device 78 may include a wide area network interface 86 for receiving broadcast data segments over the network 74. In various embodiments, the broadcast DASH gateway device 78 and the proxy device 76 may be within the same device (e.g., within the same housing).

Figure 2:
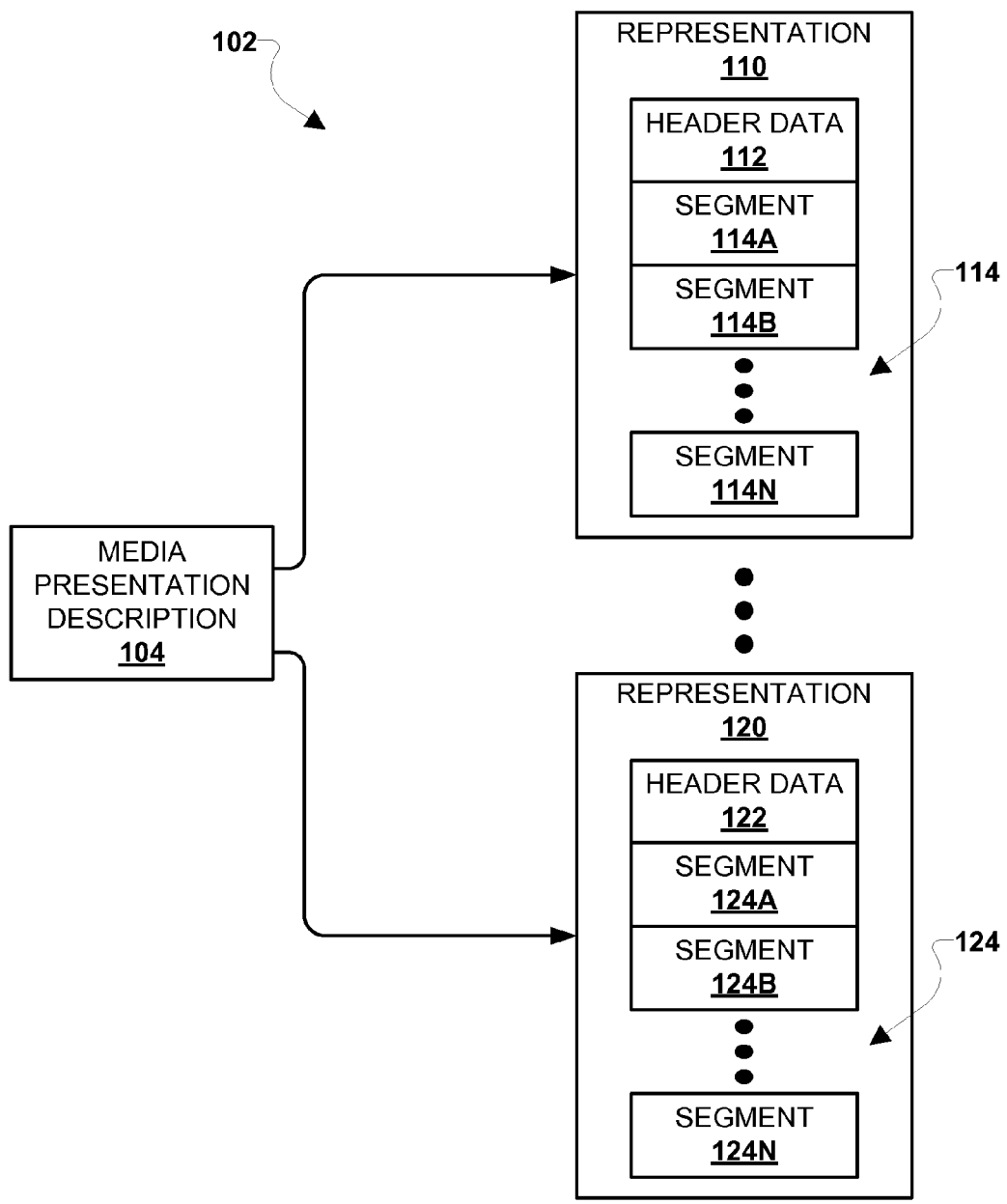
FIG. 2 is a conceptual diagram illustrating elements of example multimedia content.

FIG. 2 is a conceptual diagram illustrating elements of example multimedia content 102. Multimedia content 102 may correspond to multimedia content 64 as described above, or another multimedia content stored in memory. In the example of FIG. 2, multimedia content 102 includes media presentation description (MPD) 104 and a plurality of representations 110-120. Representation 110 includes optional header data 112 and segments 114A-114N of a segment set 114, while representation 120 includes optional header data 122 and segments 124A-124N of a segment set 124. The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1B. Likewise, representations 110-120 may correspond to representations 68 of FIG. 1B. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114A-114N, e.g., temporal locations of random access points (RAPs, also referred to as stream access points (or SAPs)), which of segments 114A-114N includes random access points, byte offsets to random access points within segments 114A-114N, uniform resource locators (URLs) of segments 114A-114N, or other aspects of segments 114A-114N. Header data 122, when present, may describe similar characteristics for segments 124A-124N. Additionally or alternatively, such characteristics may be fully included within MPD 104.

Segments 114A-114N, 124A-124N include one or more coded video samples, each of which may include frames or slices of video data. Each of the coded video samples of segments 114A-114N may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114A-114N, 124A-124N may be associated with a unique uniform resource locator (URL). Thus, each of segments 114A-114N, 124A-124N may be independently retrievable using a streaming network protocol, such as DASH. In this manner, a destination device, such as client device 40, may use an HTTP GET request to retrieve segments 114A-114N or 124A-124N. In some examples, client device 40 may use HTTP partial GET requests to retrieve specific byte ranges of segments 114A-114N or 124A-124N.

MPD 104 may include resource identifiers (e.g., uniform resource identifiers (URIs) or uniform resource locators (URLs)) for segments 114A-114N, 124A-124N, including an address for a server, such as server device 60. As explained in greater detail below, an intermediate network device (e.g., a broadcast DASH gateway device) may modify the resource identifiers of MPD 104 to correspond to an address for proxy device 76, rather than server device 60. The intermediate network device may comprise, for example, a broadcast DASH gateway module or unit. In some examples, the broadcast DASH gateway and the proxy device may be functionally integrated.

Figure 3:
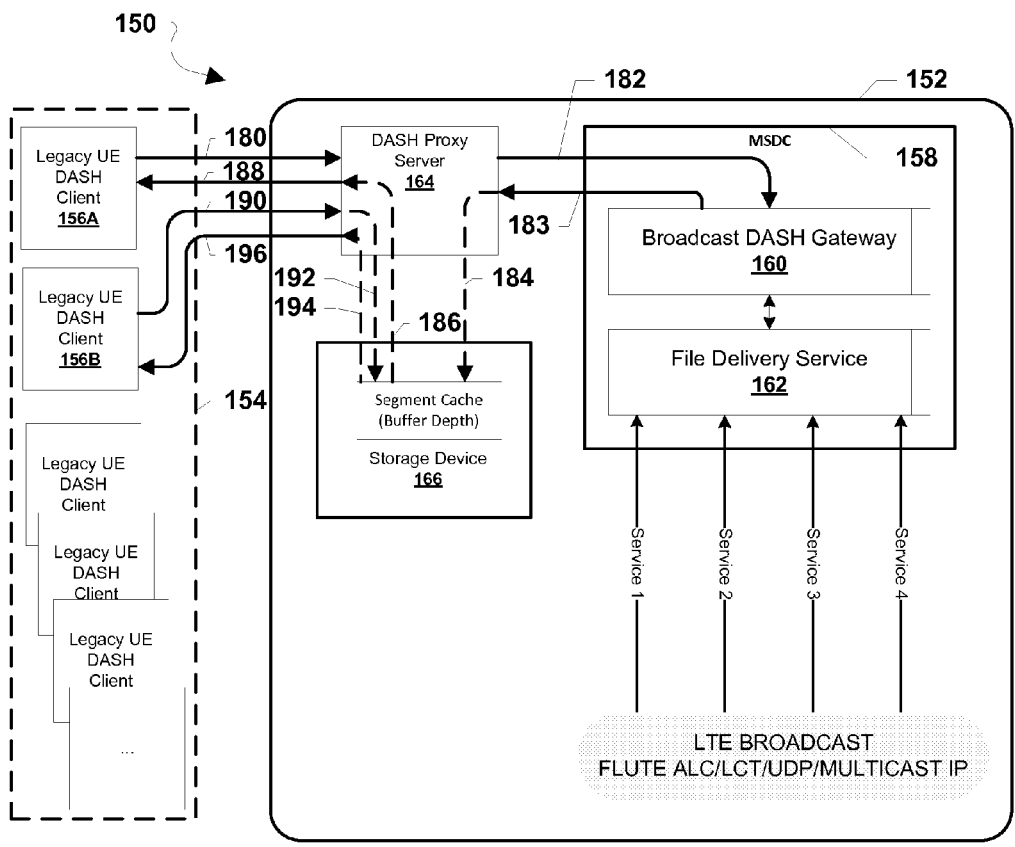
FIG. 3 is a functional flow block diagram illustrating an example system that may implement the techniques of this disclosure.

FIG. 3 is a functional flow block diagram illustrating an example system 150 that may implement the techniques of this disclosure. In this example, system 150 includes a broadcast receiving system 152 and client devices 154. Client devices 154 may include legacy user equipment (UE) DASH clients, such as legacy UE DASH clients 156A and 156B. Broadcast receiving system 152 may include multicast services device client (MSDC) 158, DASH proxy server device 164, and storage device 166 available to the DASH proxy server device 164. MSDC 158 may include broadcast DASH gateway (BDGW) device 160 (or BDGW unit) and file delivery service unit 162. In general, each of client devices 154 may include components that are substantially similar to client device 40 described above, and DASH proxy server device 164 may be substantially similar to proxy device 76 described above with reference to FIG. 1B. In an embodiment, a single gateway device may encompass the components and functionalities of the broadcast receiving system 152. For example, such a gateway device may be separate from the client devices 154 and may include the MSDC 158, DASH proxy server device 164 and storage device 166.

As explained above, DASH Proxy Server (DPS) device 164 may act as a front end request handler for an LTE Broadcast DASH Gateway (e.g., BDGW device 160). DPS device 164 may accept DASH requests from client devices 154 for a broadcast service. DPS device 164 may then serve up DASH responses to client devices 154 on behalf of BDGW device 160. BDGW device 160 may interact with file delivery service unit 162 to receive DASH media content in files (e.g., segments) from a broadcast (or multicast) server (e.g., the server device 60 described above with reference to FIG. 1B). File delivery service unit 162 may be configured to receive DASH media content, such as MPDs and segments via any of a variety of different broadcast or multicast protocols, such as, for example, File Delivery over Unidirectional Transport (FLUTE), FLUTE Asynchronous Layered Coding (FLUTE ALC), layered coding transport (LCT), user datagram protocol (UDP), and multicast Internet protocol (IP).

In the example of FIG. 3, BDGW device 160 may acts as a backend DASH content source. BDGW device 160 may be configured with a DPS proxy server address. BDGW device 160 may modify MPDs for DASH services to direct client devices 154 to DPS device 164, rather than a server device that broadcasts the corresponding content. In particular, BDGW device 160 may determine an Internet address (e.g., a domain name that resolves to an Internet protocol (IP) address via a domain name service (DNS)) for DPS device 164 and modify an MPD for a media Presentation to direct resource identifiers (e.g., URLs and/or URIs) to the address for DPS device 164, rather than to a server from which the data was received. This process may be performed prior to starting the process illustrated in FIG. 3. FIG. 3 illustrates an example process by which client devices 154 may receive broadcast media content (e.g., a segment of a representation of a media presentation).

Initially, a client device, such as legacy UE DASH client 156A, may submit a request to DPS device 164 (180). DPS device 180 may receive the request from legacy UE DASH client 156A and pass the request on to BDGW device 160 on behalf of legacy UE DASH client 156A (182). For example, the request from legacy UE DASH client 156A may comprise an HTTP request for Segment N at time T. BDGW device 160 (presumed to have received the segment via file delivery service unit 162 in accordance with a broadcast or multicast protocol, such as eMBMS) may return the requested segment to DPS device 164. In response to the request from DPS device 164, BDGW device 160 may return the requested segment to DPS device 164 (183). The DPS device 164 may then store data for the segment to a segment cache of storage device 166 (184) and return the cached segment to legacy UE DASH client 156A (186, 188).

Subsequently, a different client device, such as legacy UE DASH client 156B, may request the same segment (190).

DPS device 164 may check whether the segment is stored in the segment cache of storage device 166 (192). When the segment is stored in storage device 166 (as the segment is presumed to be in the example of FIG. 3), the DPS device 164 may retrieve data for the segment from storage device 166 (194) and send the data to legacy UE DASH client 156B (196). In this manner, DPS device 164 may cache segments after the segments are first retrieved and provide these segments to requesting ones of client devices 154 from the cache, rather than requesting the same data separately and repeatedly. In other words, the first request from a client device for a segment may be retrieved via an HTTP request from a DASH gateway and cached for subsequent client device requests for the same segment. Thus, DPS device 164 may service subsequent client device requests for the same segment by reading data for the requested segment directly from the cache.

DPS device 164 may be configured to read time-to-live (TTL) data for segments from HTTP response headers returned in the response from BDGW device 160 (not shown in FIG. 3). Segment TTL is generally the same as the TTL in the HTTP response header for that segment. Thus, DPS device 164 may be responsible for deleting segments from the segment cache of storage device 166 upon expiry of the TTL for the segments. In this manner, BDGW device 160 may be configured to make broadcast (or multicast) network data available to client devices 154 that are not capable of receiving broadcast or multicast network data.

BDGW device 160 may further be configured to modify data for a media presentation in other ways. For example, BDGW device 160 may be configured to transcode encoded audio and/or video data, e.g., to convert the encoded media data between standards. As one example, BDGW device 160 may transcode video data encoded according to high efficiency video coding (HEVC) to video data encoded according to ITU-T H.264/AVC (Advanced Video Coding). Likewise, BDGW device 160 may transcode video data between various standards, such as MPEG-2, MPEG-4, ITU-T H.263, ITU-T H.264/AVC, and/or HEVC. Transcoding between various video standards is described in greater detail in U.S. Provisional application Ser. No. 13/536,870, filed Jun. 28, 2012, which is hereby incorporated by reference in its entirety, and is included as part of this disclosure as Appendix A.

Additionally or alternatively, BDGW device 160 may transcode between profiles of a standard (e.g., H.264 high profile to H.264 baseline profile). As another example, BDGW device 160 may perform sub-bitstream extraction to extract various sub-bitstreams, e.g., to account for various dimensions of scalability (such as a spatial resolution dimension, a temporal dimension, a signal-to-noise ratio (SNR) dimension, a quality dimension, a view dimension, a color bit depth dimension, a chrominance (chroma) sample format dimension, a dependency dimension, or the like) and/or to select one or more views for single-view, stereo view, and/or multiview video capable devices (which may include either or both of texture and depth data). BDGW device 160 may form multiple representations from these various modifications.

In general, a scalable dimension of video data may include one or more elements. For example, a view dimension may include a single view for two-dimensional video, two views for stereo video, or N views (where N is an integer greater than two) for multiview video data. As another example, a temporal dimension may include a first layer of pictures for supporting a base frame rate (e.g., 15 frames per second (fps)), and one or more higher layers for supporting higher frame rates (e.g., 30 fps, 60 fps, and 120 fps). A signal-to-noise ratio (SNR) dimension may correspond to various levels of data for improving the SNR of video data. A quality dimension may correspond to a number of bits used to represent coefficients of video data. A color bit depth dimension may correspond to the number of bits used to represent coefficients of chrominance (chroma) components of video data. A chroma sample format dimension may indicate the resolution of chroma components relative to luma components, e.g., 4:2:0 format, 4:2:2 format, or 4:4:4 format. Dependency dimensions may correspond to dimensions that are used to code dependent dimensions, e.g., base layers that are used as reference to code enhancement layers.

Figure 4:
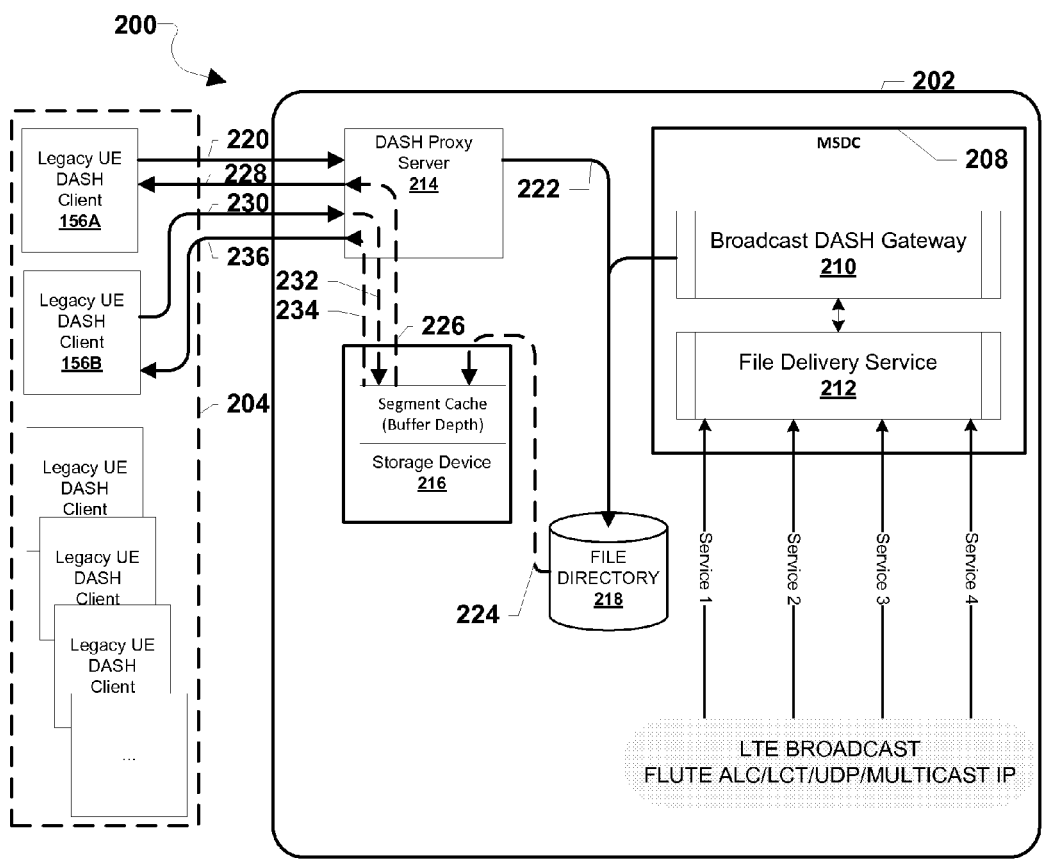
FIG. 4 is a functional flow block diagram illustrating another example system that may implement the techniques of this disclosure.

FIG. 4 is a functional flow block diagram illustrating an example system 200 that may implement the techniques of this disclosure. In this example, system 200 includes a broadcast receiving system 202 and client devices 204. Client devices 204 may include legacy user equipment (UE) DASH clients, such as legacy UE DASH clients 206A and 206B. Broadcast receiving system 202 may include a multicast services device client (MSDC) 208, DASH proxy server device 214, and a storage device 216 available to the DASH proxy server device 214. MSDC 208 may include a broadcast DASH gateway (BDGW) device 210 and file delivery service unit 212. In general, each of client devices 204 may include components that are substantially similar to client device 40 as described above with reference to FIG. 1B, and DASH proxy server device 214 may be substantially similar to proxy device 76 described above with reference to FIG. 1B. In an embodiment, a single gateway device may encompass the components and functionalities of the broadcast receiving system 202. For example, such a gateway device may be separate from the client devices 204 and may include the MSDC 208, DASH proxy server device 214 and storage device 216.

As explained above, DASH Proxy Server (DPS) device 214 may act as a front end request handler for an LTE Broadcast DASH Gateway, e.g., BDGW device 210. DPS device 214 may accept DASH requests from client devices 204 for a broadcast service. DPS device 214 may then serve up DASH responses to client devices 204 on behalf of BDGW device 210. BDGW device 210 may interact with file delivery service unit 212 to receive DASH media content in files (e.g., Segments) from a broadcast (or multicast) server, such as the server device 60 described above with reference to FIG. 1B.

In the example of FIG. 4, BDGW device 210 may act as a backend DASH content source. In this example, BDGW device 210 may be configured with the proxy server address of DPS device 214. BDGW device 210 may modify all MPDs for DASH Services to point client devices 204 to DPS device 214. Modified MPDs in the service announcement file may be published to client devices 204 (not shown in FIG. 4). DPS device 214 may be configured with the storage location (e.g., file directory 218) for the broadcast service content (e.g., MPD, initialization, and media segments) (not shown in FIG. 4).

DPS device 214 may create a cache for the broadcast DASH service. BDGW device 210 may generally store received segments to file directory 218. Thus, when DPS device 214 receives a request for a segment directly from a client device, such as legacy UE DASH client 206A (220), DPS device 214 may retrieve the initial requests for a segment from the shared storage location (populated asynchronously by BDGW device 210) (222), store the segment to a segment cache of storage device 216 (224), and return data for the segment from the segment cache of storage device 216 to legacy UE DASH client 206A (226, 228).

Likewise, DPS device 214 may service all subsequent requests for the same segment from the segment cache of storage device 216. For example, after receiving a request for a segment from legacy UE DASH client 206B (230), DPS device 214 may determine whether data for the segment is stored in the segment cache of storage device 216 (232). When the segment is stored in storage device 216 (as the segment is presumed to be in the example of FIG. 4), DPS device 214 may retrieve data for the segment from storage device 216 (234) and send the data to legacy UE DASH client 206B (236). In this manner, DPS device 214 may cache segments after the segments are first retrieved and provide these segments to requesting ones of client devices 204 from the cache, rather than requesting the same data separately and repeatedly. In other words, the first request from a client device for a segment may be retrieved via an HTTP request from a DASH gateway and cached for subsequent client device requests for the same segment. Thus, DPS device 214 may service subsequent client device requests for the same segment by reading data for the requested segment directly from the cache.

The time to live (TTL) for a segment, both in DPS device 214 internal cache and file directory 218, may be controlled by the "Buffer Depth" value configured in the MPD. DPS device 214 may retrieve the TTL from the MPD and delete segments from file directory 218 (and the segment cache of storage device 216) when the TTL expires.

BDGW device 210 may also be configured to modify video data of segments in accordance with the various modifications described with respect to FIG. 3 (e.g., transcoding, sub-bitstream extraction, etc.).

In one embodiment, a USB device, such as the USB device 19 in FIG. 1A, may include some or all of the components of the broadcast receiving system 152 (FIG. 3) and/or some or all of the components of the broadcast receiving system 202 in FIG. 4.

In this manner, BDGW devices 160 and 210 of FIGS. 3 and 4, respectively, represent examples of a device configured to receive a manifest file via a first type of network protocol, wherein the manifest file includes data defining network addresses for one or more network resources, determine a network address of a proxy server for the network resources, wherein the proxy server is configured to accept requests conforming to a second type of network protocol, wherein the second type is different than the first type, modify the data of the manifest file defining the network addresses for the network resources to include at least a portion defining the network address of the proxy server, and send the modified manifest file to the proxy server.

Figure 5A:
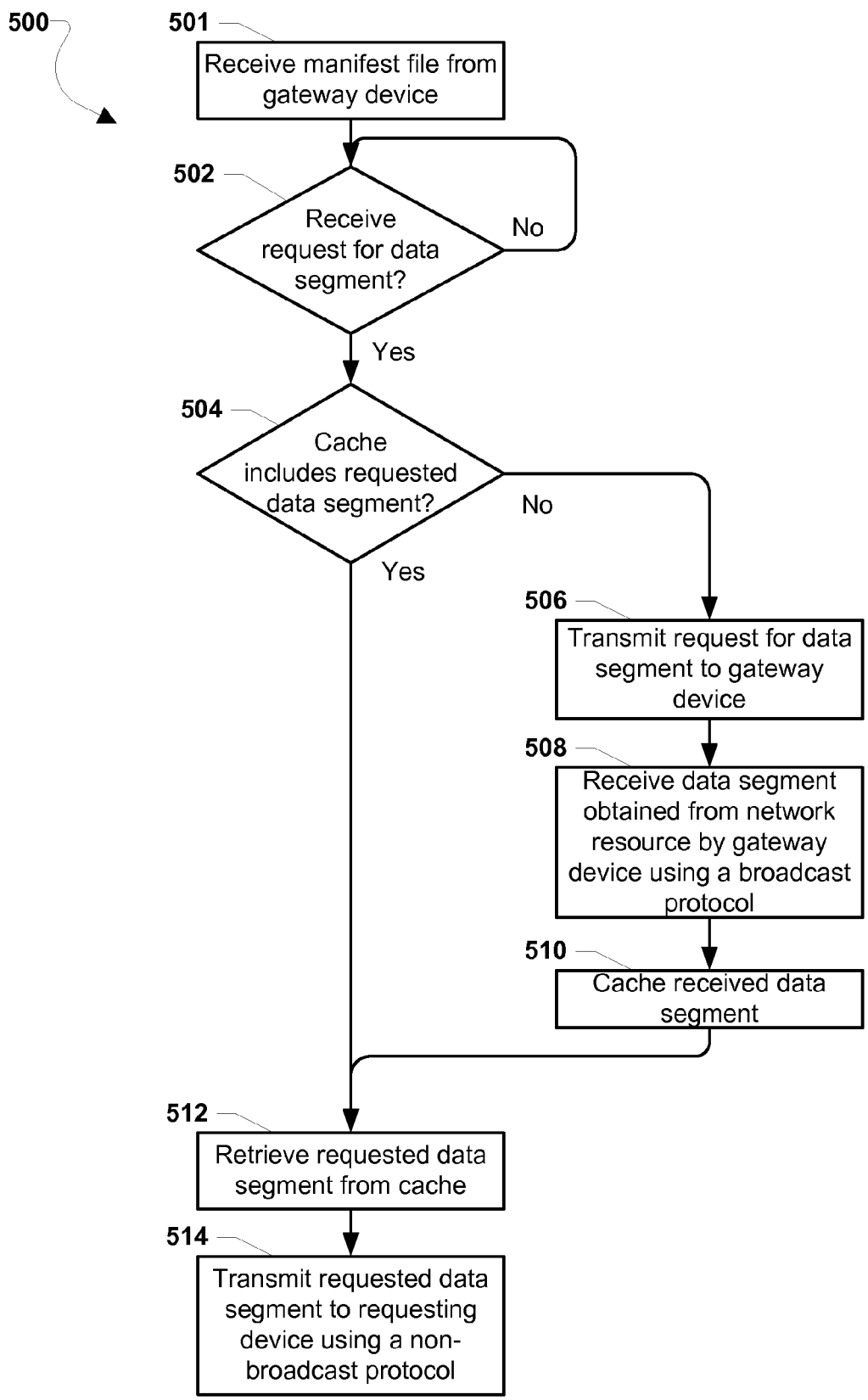
FIGS. 5A-5B are process flow diagrams of embodiment methods for a proxy server to provide data from a gateway device to a client device via non-broadcast protocols.

FIG. 5A illustrates an embodiment method 500 for a proxy server device to provide data from a gateway device to a client device via non-broadcast protocols. As described above, the proxy server device (e.g., a DASH proxy server or DPS device) may be configured to communicate with both a gateway device (e.g., broadcast DASH gateway) and various client devices, such as set-top boxes and mobile devices. In an embodiment, the proxy server device may perform the method 500 to provide DASH segments received from the gateway device, such as streaming media data segments received from Internet data sources via an LTE connection, to client devices via a unicast protocol, such as via WiFi over a local area network. In various embodiments, the proxy server device may be a device, unit, module, or other component within the gateway device. For example, a gateway device may include a proxy server device (or proxy server unit) that communicates with a gateway module via inter-process communications (or IPC).

In block 501, the proxy server device may receive a manifest file from the gateway device. As described above the manifest file may include information indicating network addresses for network resources (e.g., DASH segments, media files, etc.). In an embodiment, the manifest file may be obtained at the client device by a unicast retrieval unit. In determination block 502, the proxy server device may determine whether a request for a data segment is received, such as a request from a client device transmitted via a unicast protocol. In various embodiments, the data segment may be configured for use with Dynamic Adaptive Streaming over HTTP (DASH) technology.

So long as no request is received (i.e., determination block 502="No"), the proxy server device may continue awaiting requests with the operations in determination block 502. When a request is received (i.e., determination block 502="Yes"), the proxy server device may determine whether a cache includes the requested data segment in determination block 504. For example, the proxy server device may perform a look-up on a data structure or buffer within the cache to detect whether the requested data segment is already available to the proxy server device (e.g., an initial request for the data segment has already been handled). If the cache does not include the requested data segment (i.e., determination block 504="No"), in block 506 the proxy server device may transmit a request for the data segment to the gateway device. In various embodiments, the manifest may include the addresses for obtaining the requested data segment, such as the network resource addresses that may be communicated with by the gateway device to receive requested DASH segments. In block 508, the proxy server device may receive the data segment obtained from a network resource by the gateway device using a broadcast protocol (e.g., LTE broadcast communications with a streaming media server over the Internet). In other words, the gateway device may be capable of receiving broadcast communications, such as from a remote server. Broadcast protocols may include one of File Delivery over Unidirectional Transport (FLUTE), FLUTE Asynchronous Layered Coding (FLUTE ALC), layered coding transport (LCT), user datagram protocol (UDP), broadcast reception of real-time protocol (RTP) content, and multicast Internet protocol (IP). In block 510, the proxy server device may cache the received data segment, such as by storing the data segment in a segment cache storage device as described above.

If the cache does include the requested data segment (i.e., determination block 504="Yes"), or if the operations in block 510 are performed, the proxy server device may retrieve the requested data segment from the cache in block 512. In block 514, the proxy server device may transmit the requested data segment to the requested client device using a non-broadcast protocol, such as a unicast protocol. In an embodiment, the client device may be a device configured to execute a client application that utilizes the streaming data segment.

Figure 5B:
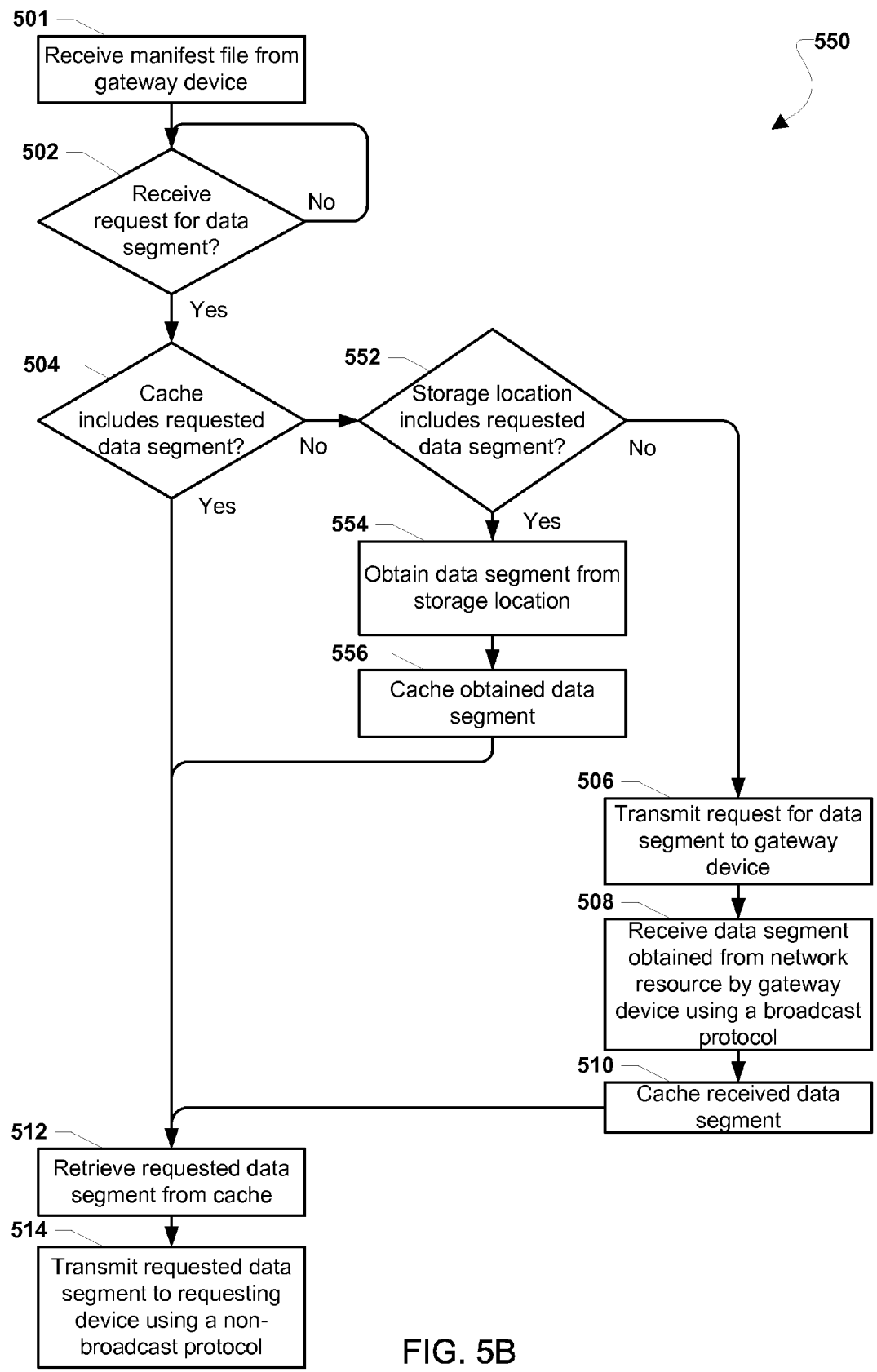

FIG. 5B illustrates another embodiment method 550 for a proxy server device to provide data from a gateway device to a client device via non-broadcast protocols. The method 550 is similar to the method 500 described above, except the proxy server device may perform the method 550 when configured to utilize a storage location or file directory (e.g., a hard drive or external storage device accessible to the proxy server device, etc.) in addition to a cache. For example, data segments may be automatically and/or asynchronously stored in the storage location by the gateway device without being requested by the proxy server device.

In block 501, the proxy server device may receive a manifest file from the gateway device. In determination block 502, the proxy server device may determine whether a request for a data segment is received, such as a request from a client device transmitted via a unicast protocol. So long as no request is received (i.e., determination block 502="No"), the proxy server device may continue awaiting a request in determination block 502. when a request is received (i.e., determination block 502="Yes"), the proxy server device may determine whether a cache includes the requested data segment in determination block 504. If the cache does not include the requested data segment (i.e., determination block 504="No"), the proxy server device may determine whether a storage location includes the requested data segment in determination block 552, such as by performing a look-up operation corresponding to the requested data segment on a data structure within the storage location. If the storage location includes the requested data segment (i.e., determination block 552="Yes"), the proxy server device may obtain the data segment from the storage location in block 554, and may cache the obtained data segment in block 556.

If the storage location does not include the requested data segment (i.e., determination block 552="No"), the proxy server device may transmit a request for the data segment to the gateway device in block 506. In block 508, the proxy server device may receive the data segment obtained from a network resource by the gateway device using a broadcast protocol. In block 510, the proxy server device may cache the received data segment.

If the cache does include the requested data segment (i.e., determination block 504="Yes"), or the proxy server device performs the operations described above with reference to block 556 or block 510, the proxy server device may retrieve the requested data segment from the cache in block 512. In block 514, the proxy server device may transmit the requested data segment to the requested client device using a non-broadcast protocol, such as a unicast protocol.

Figure 6A:
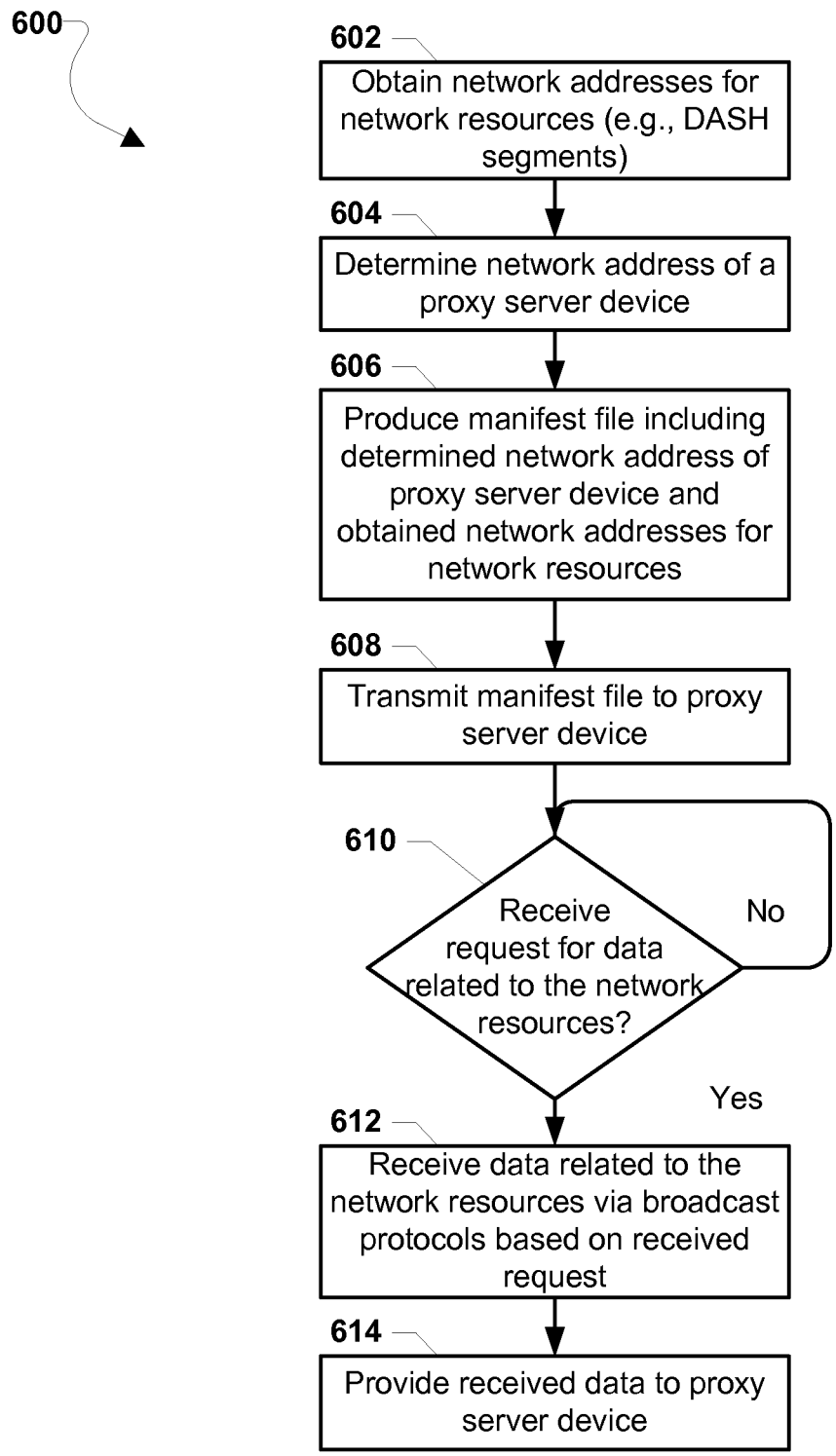
FIGS. 6A-6B are process flow diagrams of embodiment methods for a gateway device to provide information and data related to broadcast content to a proxy server.

FIG. 6A illustrates an embodiment method 600 for a gateway device (or broadcast DASH gateway device) to provide information and data related to broadcast content to a proxy server device. As described above, the gateway device may be configured to receive communications from network resources via broadcast protocols (e.g., streaming content from media streaming servers via LTE broadcasts). In response, the gateway device may provide related data to the proxy server device for delivery to client devices, such as set-top boxes or tablets configured to consume DASH segments. In various embodiments, the gateway device may include the proxy server device. For example, the proxy server device may be a device, unit, module, or other component within the gateway device.

In block 602, the gateway device may obtain network addresses for network resources, such as addresses for DASH segments maintained by HTTP servers accessible via the Internet. In block 604, the gateway device may determine a network address of the proxy server device. For example, the gateway device may determine the IP address of the proxy server device on a local area network. In an embodiment, the gateway device may receive data defining the network address of the proxy server device via inter-process communications (IPC) and may determine the IP address of the proxy server device based on the received data. In block 606, the gateway device may produce a manifest file that includes the determined network address of the proxy server device and obtained network addresses for the network resources. In an embodiment, the gateway device may modify a manifest file received from a network resource, such as an MPD related to a streaming media file. In block 608, the gateway device may transmit the manifest file to the proxy server device. For example, the gateway device may transmit a message that includes a modified MPD related to streaming DASH data segments. In determination block 610, the gateway device may determine whether a request for data related to the network resources is received. For example, the gateway device may determine whether the proxy server device has relayed a request from a client device for a particular DASH data segment. So long as no request is received (i.e., determination block 610="No"), the gateway device may continue to await a request in determination block 610.

When a request is received (i.e., determination block 610="Yes"), the gateway device may receive the data related to the network resources via broadcast protocols based on the received request in block 612. For example, the gateway device may receive a DASH data segment from a streaming media server via LTE broadcasts transmissions. In an embodiment, the gateway device may also utilize a file delivery service component, software, routines, or connected devices in receiving/handling the data, as described above. In block 614, the gateway device may provide the received data to the proxy server device, such as by transmitting the data to the proxy server device for storage in a cache unit. In an embodiment, the gateway device may provide the data to the proxy server device via inter-process communications (IPC), such as when the proxy server device is a unit, process, thread, or module within the gateway device.

Figure 6B:
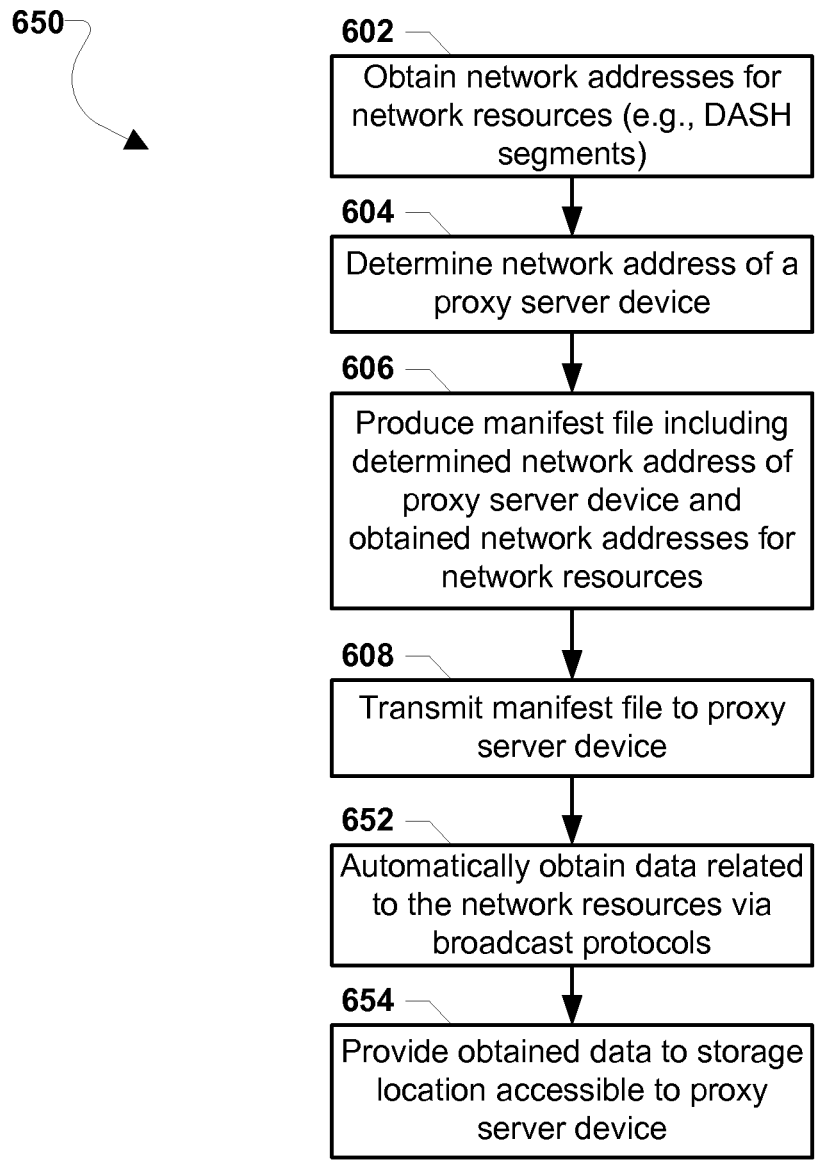

FIG. 6B illustrates an embodiment method 650 for a gateway device (or broadcast DASH gateway device) to provide information and data related to broadcast content to a proxy server device. The method 650 is similar to the method 600 described above, except that the method 650 may include operations for providing data, such as media file data segments, to a storage location accessible by the proxy server device. In other words, the gateway device may be configured to provide data without first receiving requests for the data.

In block 602, the gateway device may obtain network addresses for network resources. In block 604, the gateway device may determine a network address of the proxy server device. In block 606, the gateway device may produce a manifest file that includes the determined network address of the proxy server device and obtained network addresses for the network resources. In block 608, the gateway device may transmit the manifest file to the proxy server device.

In block 652, the gateway device may automatically obtain data related to the network resources via broadcast protocols. In other words, the data may be obtained and subsequently transmitted to the proxy server device without first receiving a request. In an embodiment, the gateway device may periodically transmit download requests for the network resources until all segments of a media file have been obtained. In block 654, the gateway device may provide the obtained data to a storage location accessible to the proxy server device. For example, the gateway device may transmit obtained data segments to an external hard drive, server, and/or other storage device with which the proxy server device is configured to exchange data/signals. The gateway device may transmit the obtained data in an asynchronous manner.

Figure 7:
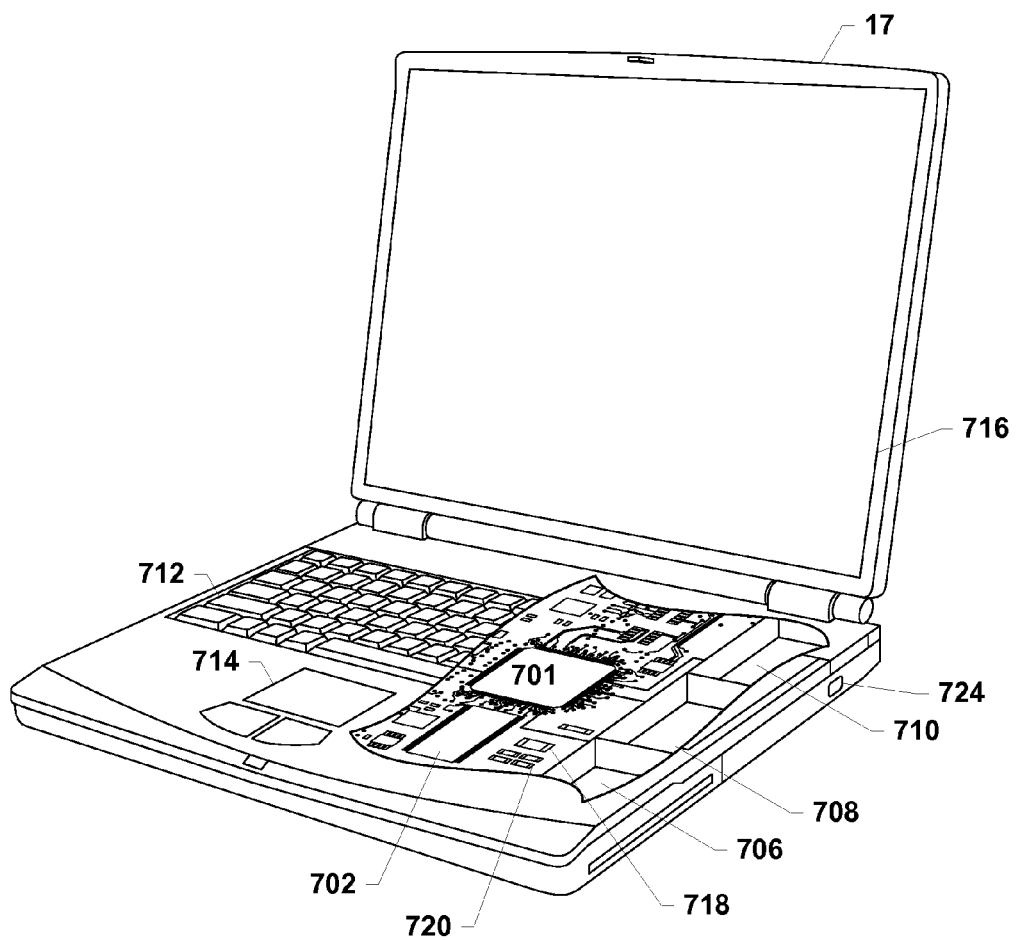
FIG. 7 is a component block diagram of an example laptop mobile computing device suitable for use with the various aspects.

Various forms of computing devices, including personal computers and laptop computers, may be used to implement the various embodiments. Such mobile computing devices typically include the components illustrated in FIG. 7 which illustrates an example laptop mobile computing device 17. Many laptop computers include a touch pad 714 that serves as the computer's pointing device. A laptop mobile computing device 17 typically includes a processor 701 coupled to volatile internal memory 702 and a large capacity nonvolatile memory, such as a disk drive 706. The laptop mobile computing device 17 may also include a compact disc (CD) and/or DVD drive 708 coupled to the processor 701. The laptop mobile computing device 17 may also include a number of connector ports 710 coupled to the processor 701 for establishing data connections or receiving external memory devices, such as a network connection circuit for coupling the processor 701 to a network. The laptop mobile computing device 17 may also include a USB port 724 coupled to the processor. The laptop mobile computing device 17 may have one or more wireless transceivers 718 (e.g., WiFi and Bluetooth®) and antennas 720 for sending and receiving wireless signals. In a laptop or notebook configuration, the computer housing includes the touch pad 714, the keyboard 712, and the display 716 all coupled to the processor 701. Other configurations of the laptop mobile computing device may include a computer mouse or trackball coupled to the processor (e.g., via a USB input) as are well known, which may also be used in conjunction with the various aspects.

Figure 8:
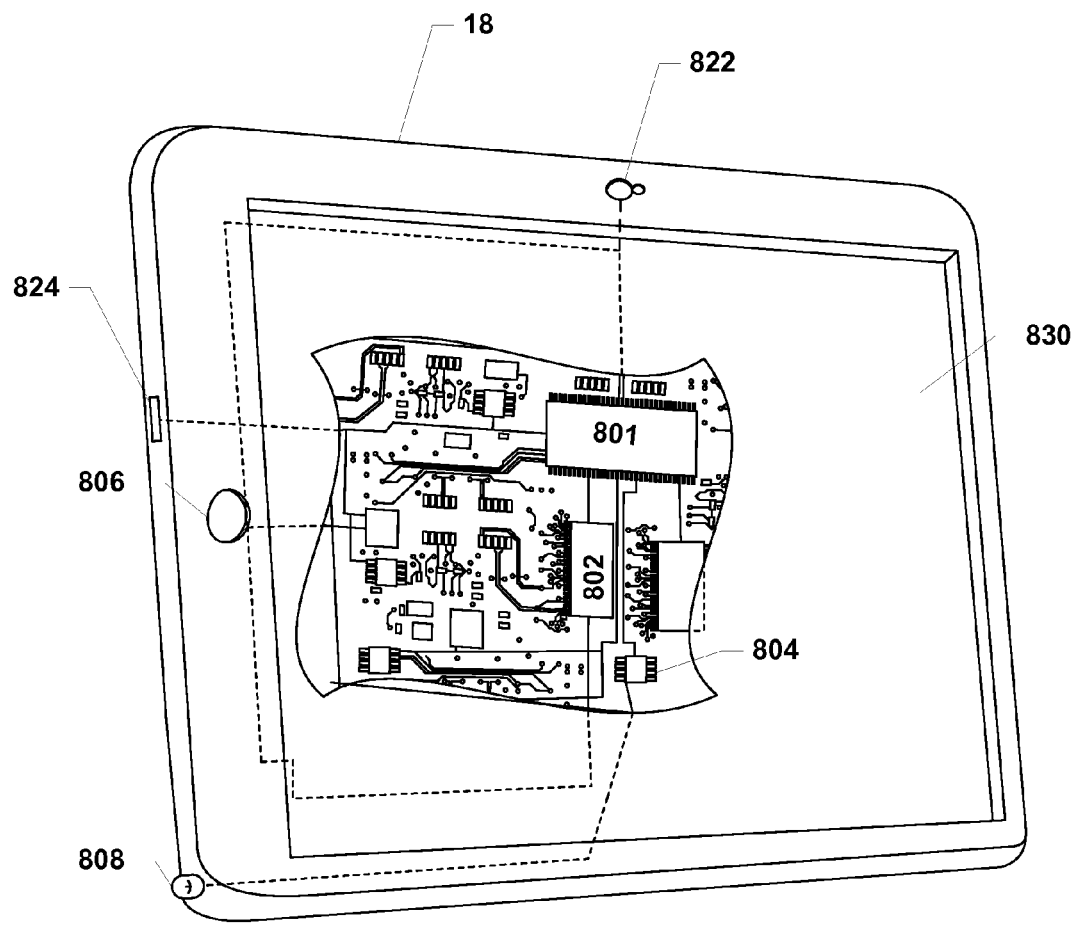
FIG. 8 is a component block diagram of an example tablet computing device suitable for use with the various embodiments.

The various embodiments may be implemented using any of a variety of tablet devices, an example of which is illustrated in FIG. 8. For example, the tablet mobile computing device 18 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touchscreen display 830, such as a resistive-sensing touch screen, capacitive-sensing touch screen infrared sensing touch screen, etc. The tablet mobile computing device 18 may have one or more wireless transceivers 804 (e.g., long-term evolution (LTE) and antennas 808 for sending and receiving wireless signals as described herein. The transceivers 804 and antennas 808 may be used with the above-mentioned circuitry to implement the various wireless transmission protocol stacks and interfaces. The tablet mobile computing device 18 may also include a physical button 806 for receiving user inputs. The tablet mobile computing device 18 may include a speaker 822 configured to render audio information. The tablet mobile computing device 18 may also include a USB port 824 coupled to the processor.

Figure 9:
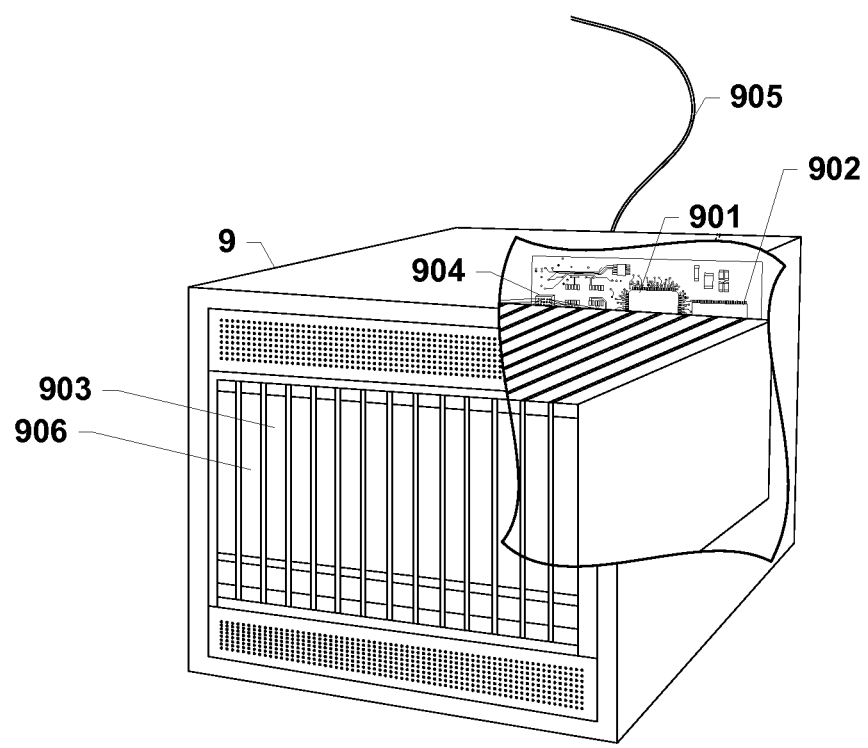
FIG. 9 is a component block diagram of a server device suitable for use in an embodiment.

The various embodiments may be implemented on any of a variety of commercially available server devices, such as the server 9 illustrated in FIG. 9. Such a server 9 typically includes a processor 901 coupled to volatile memory 902 and a large capacity nonvolatile memory, such as a disk drive 1903. The server 9 may also include a floppy disc drive, compact disc (CD) or DVD disc drive 906 coupled to the processor 901. The server 9 may also include network access ports 904 coupled to the processor 901 for establishing data connections with a network 905, such as a local area network coupled to other broadcast system computers and servers.

The processors 81, 85, 701, 801, and 901 may be any programmable microprocessor, microcomputer or multiple processor chip or chips that can be configured by software instructions (applications) to perform a variety of functions, including the functions of the various aspects described above. In the various devices, multiple processors may be provided, such as one processor dedicated to wireless communication functions and one processor dedicated to running other applications. Typically, software applications may be stored in the internal memory 80, 84, 702, 802, and 902 before they are accessed and loaded into the processors 81, 85, 701, 801, and 901. The processors 81, 85, 701, 801, and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 81, 85, 701, 801, and 901 including internal memory or removable memory plugged into the various devices and memory within the processors 81, 85, 701, 801, and 901.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory processor-readable storage medium. The steps of a method or algorithm disclosed herein may be embodied in a processor-executable software module or processor-executable software instructions that may reside on or be stored on a non-transitory processor-readable storage medium. Non-transitory processor-readable storage media may be any available media that may be accessed by a computer. By way of example, and not limitation, non-transitory processor-readable storage media may include RAM, ROM, EEPROM, CD-ROM or other optical disk storage, magnetic disk storage or other magnetic storage devices, or any other medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable storage medium. Additionally, the operations of a method or algorithm may reside as one or any combination or set of codes and/or instructions on a tangible, non-transitory machine readable medium and/or non-transitory processor-readable storage medium that may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for a gateway device capable of receiving broadcast communications to enable a client device without native broadcast-reception capabilities to access broadcast data, comprising:
receiving a streaming data segment via transmissions using a broadcast protocol;
modifying a manifest file of the streaming data segment to change a resource identifier indicating a network address for a server broadcasting the streaming data segment to correspond to an address for a proxy server unit;
providing the modified manifest file from the gateway device to the proxy server unit;
receiving a request, via the proxy server unit, for the streaming data segment from the client device based on the modified manifest file, wherein the client device is a separate device from the gateway device and wherein the request received at the proxy server unit uses a unicast protocol; and
transmitting the received streaming data segment from the proxy server unit to the client device using the unicast protocol in response to the request.

2. The method of claim 1, wherein the streaming data segment is configured for use with Dynamic Adaptive Streaming over HTTP (DASH) technology.

3. The method of claim 1, wherein the broadcast protocol includes one of File Delivery over Unidirectional Transport (FLUTE), FLUTE Asynchronous Layered Coding (FLUTE ALC), layered coding transport (LCT), user datagram protocol (UDP), broadcast reception of real-time protocol (RTP) content, and multicast Internet protocol (IP).

4. The method of claim 1, further comprising:
determining the network address of the proxy server unit for one or more network resources that are available via the broadcast protocol.

5. The method of claim 1, further comprising transmitting the streaming data segment to a storage location available to the proxy server unit.

6. The method of claim 5, wherein the storage location available to the proxy server unit is a storage device available to the proxy server unit.

7. The method of claim 6, wherein transmitting the streaming data segment comprises transmitting the streaming data segment to the storage device without receiving the request.

8. The method of claim 6, further comprising receiving data defining the network address of the proxy server unit from the proxy server unit via inter-process communications (IPC).

9. A gateway device capable of receiving broadcast communications to enable a client device without native broadcast-reception capabilities to access broadcast data, comprising:
means for receiving a streaming data segment via transmissions using a broadcast protocol;
means for modifying a manifest file of the streaming data segment to change a resource identifier indicating a network address for a server broadcasting the streaming data segment to correspond to an address for a proxy server unit;
means for providing the modified manifest file from the gateway device to the proxy server unit;
means for receiving a request, via the proxy server unit, for the streaming data segment from the client device based on the modified manifest file, wherein the client device is a separate device from the gateway device and wherein the request received at the proxy server unit uses a unicast protocol; and
means for transmitting the received streaming data segment from the proxy server unit to the client device using the unicast protocol in response to the request.

10. The gateway device of claim 9, further comprising:
means for determining the network address of the proxy server unit for one or more network resources that are available via the broadcast protocol.

11. The gateway device of claim 9, further comprising means for transmitting the streaming data segment to a storage location available to the proxy server unit.

12. The gateway device of claim 11, wherein the storage location available to the proxy server unit is a storage device available to the proxy server unit.

13. The gateway device of claim 12, further comprising means for receiving data defining the network address of the proxy server unit from the proxy server unit via inter-process communications (IPC).

14. A non-transitory processor-readable storage medium having stored thereon processor-executable software instructions configured to cause a processor of a gateway device to perform operations comprising:
  receiving a streaming data segment via transmissions using a broadcast protocol;
  modifying a manifest file of the streaming data segment to change a resource identifier indicating a network address for a server broadcasting the streaming data segment to correspond to an address for a proxy server unit;
  providing the modified manifest file from the gateway device to the proxy server unit;
  receiving a request, via the proxy server unit, for the streaming data segment from a client device based on the modified manifest file, wherein the client device is a separate device from the gateway device and wherein the request received at the proxy server unit uses a unicast protocol; and
  transmitting the received streaming data segment from the proxy server unit to the client device using the unicast protocol in response to the request.

15. The non-transitory processor-readable storage medium of claim 14, wherein the stored processor-executable software instructions are configured to cause the processor of the gateway device to perform operations further comprising:
  determining the network address of the proxy server unit for one or more network resources that are available via the broadcast protocol.

16. The non-transitory processor-readable storage medium of claim 14, wherein the stored processor-executable software instructions are configured to cause the processor of the gateway device to perform operations further comprising transmitting the streaming data segment to a storage location available to the proxy server unit.

17. The non-transitory processor-readable storage medium of claim 16, wherein the storage location available to the proxy server unit is a storage device available to the proxy server unit.

18. The non-transitory processor-readable storage medium of claim 17, wherein transmitting the streaming data segment comprises transmitting the streaming data segment to the storage device without receiving the request.

19. The non-transitory processor-readable storage medium of claim 17, wherein the stored processor-executable software instructions are configured to cause the processor of the gateway device to perform operations further comprising receiving data defining the network address of the proxy server unit from the proxy server unit via inter-process communications (IPC).

* * * * *